United States Patent [19]
Tan

[11] Patent Number: 5,825,421
[45] Date of Patent: Oct. 20, 1998

[54] VIDEO CODING METHOD AND DECODING METHOD AND DEVICES THEREOF

[75] Inventor: Thiow Keng Tan, Singapore, Singapore

[73] Assignee: Matsushita Electronic Industrial Co., Ltd., Osaka, Japan

[21] Appl. No.: 773,574

[22] Filed: Dec. 27, 1996

[30] Foreign Application Priority Data

Dec. 27, 1995 [JP] Japan .................................. 7-340609

[51] Int. Cl.⁶ ................................................ H04N 7/32
[52] U.S. Cl. .................... 348/409; 348/413; 348/415; 348/699
[58] Field of Search .................... 348/409, 413, 348/415, 396, 416, 699, 402; 382/56; H04N 7/32

[56] References Cited

U.S. PATENT DOCUMENTS

| | | | |
|---|---|---|---|
| 5,136,378 | 8/1992 | Tsurube | 358/136 |
| 5,144,426 | 9/1992 | Tanka et al. | 358/133 |
| 5,150,432 | 9/1992 | Ueno et al. | 382/56 |
| 5,155,593 | 10/1992 | Yonemitsu et al. | 358/133 |
| 5,267,334 | 11/1993 | Normille et al. | 382/56 |
| 5,293,229 | 3/1994 | Iu . | |
| 5,315,326 | 5/1994 | Sugiama | 348/415 |
| 5,361,105 | 11/1994 | Iu . | |
| 5,386,234 | 1/1995 | Veltman et al. | 348/409 |
| 5,412,428 | 5/1995 | Tahara | 348/396 |
| 5,481,310 | 1/1996 | Hibi | 348/413 |

OTHER PUBLICATIONS

Secretariat: Japan (JISC), "Coded Representation of Audio, Picture, Multimedia and Hypermedia Information," ISO/IEC JTC 1/SC 29 N 313, dated May 20, 1993.
"Recommendation H.261—Video Codec for Audiovisual Services at px 64 kbit/s", International Telegraph and Telephone Consultative Committee, Study Group XV—Report R 37, Aug. 1990.

Primary Examiner—Tommy P. Chin
Assistant Examiner—Tung Vo
Attorney, Agent, or Firm—Ratner & Prestia

[57] ABSTRACT

A new predictive coding is used to increase the temporal frame rate and coding efficiency without introducing excessive delay. Currently the motion vector for the blocks in the bi-directionally predicted frame is derived from the motion vector of the corresponding block in the forward predicted frame using a linear motion model. This however is not effective when the motion in the image sequence is not linear. The efficiency of this method can be further improved if a non-linear motion model is used. In this model a delta motion vector is added to or subtracted from the derived forward and backward motion vector, respectively. The encoder performs an additional search to determine if there is a need for the delta motion vector. The presence of this delta motion vector in the transmitted bitstream is signalled to the decoder which then takes the appropriate action to make use of the delta motion vector to derive the effective forward and backward motion vectors for the bi-directionally predicted block.

12 Claims, 6 Drawing Sheets

PB FRAME PREDICTION

PB FRAME
LINEAR MOTION MODEL

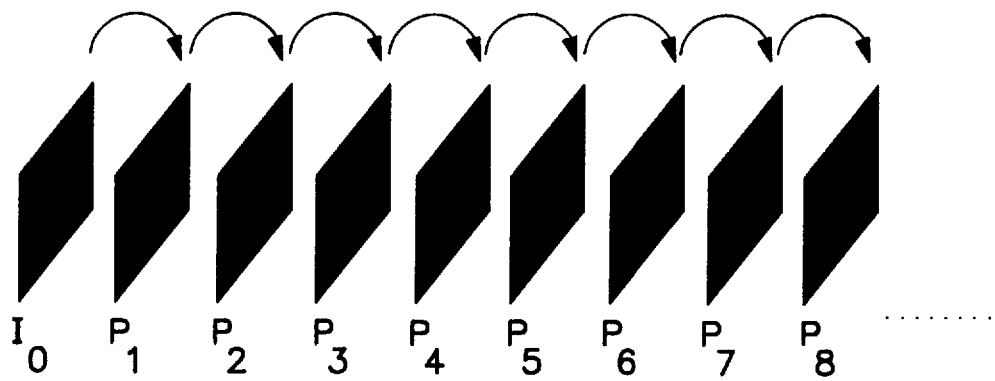
FIG. IA
PRIOR ART (H.261)
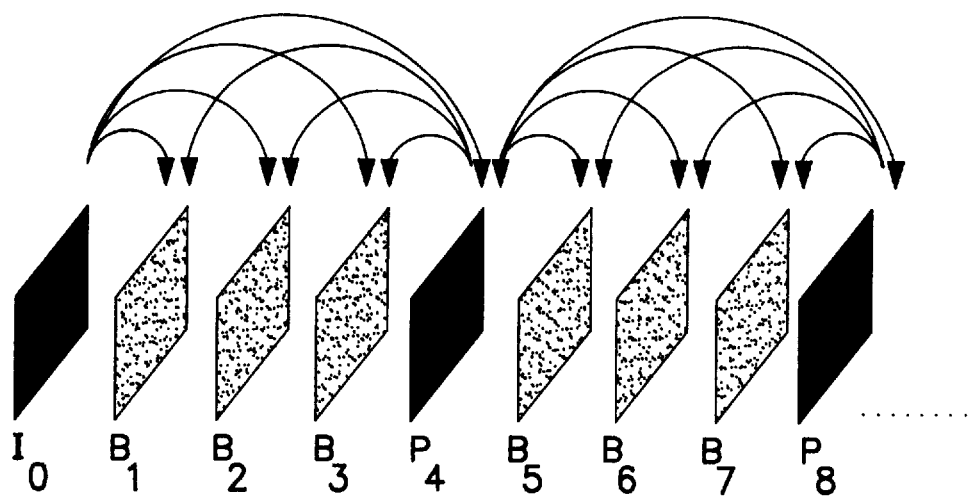
FIG. IB
PRIOR ART (MPEG)

PB FRAME PREDICTION

B-BLOCK PREDICTION

LINEAR MOTION MODEL

NON-LINEAR MOTION MODEL

Decoder Block Diagram

VIDEO CODING METHOD AND DECODING METHOD AND DEVICES THEREOF

BACKGROUND OF THE INVENTION

1. Field of the Invention

This invention can be used in low bit rate video coding for tele-communicative applications. It improves the temporal frame rate of the decoder output as well as the overall picture quality.

2. Related art of the Invention

In a typical hybrid transform coding algorithm such as the ITU-T Recommendation H.261 [1] and MPEG [2] motion compensation is used to reduce the amount of temporal redundancy in the sequence. In the H.261 coding scheme, the frames are coded using only forward prediction, hereafter referred to as P-frames. In the MPEG coding scheme, some frames are coded using bi-direction prediction, hereafter referred to as B-frames. B-frames improve the efficiency of the coding scheme. Now the [1] is ITU-T Recommendation H.261 (Formerly CCITT Recommendation H.261) Codes for audiovisual services at p×64 kbit/s Geneva, 1990, and the [2] is ISO/IEC 11172-2 1993, Information technology—Coding of moving pictures and associated audio for digital storage media at up to about 1,5 Mbit/s - Part 2: Video.

However, it introduces delay in the encoding and decoding, making it unsuitable for applications in the communicative services where delay is an important parameter. FIG. 1a and 1b illustrates the frame prediction of H.261 and MPEG as described above. A new method of coding involving the coding of the P and B frames as a single unit, hereafter referred to as the PB-frame, was introduced. In this scheme the blocks in the PB-frames are coded and transmitted together thus reducing the total delay. In fact the total delay should not be more than a scheme using forward prediction only but at half the frame rate.

FIG. 2a shows the PB-frame prediction. A PB-frame consists of two pictures being coded as one unit. The name PB comes from the name of picture types in MPEG where there are P-frames and B-frames. Thus a PB-frame consists of one P-frame which is predicted from the last decoded P-frame and one B-frame which is predicted both from the last decoded P-frame and the P-frame currently being decoded. This last picture is called B-frame because parts of it may be bi-directionally predicted from the past and future P-frame.

FIG. 2b shows the forward and bi-directional prediction for a block in the B-frame, hereafter referred to as a B-block. Only the region that overlaps with the corresponding block in the current P-frame, hereafter referred to as the P-block, is bi-directionally predicted The rest of the B-block is forward predicted from the previous frame. Thus only the previous frame is required in the frame store. The information from the P-frame is obtained from the P-block currently being decoded.

In the PB-block only the motion vectors for the P-block is transmitted to the decoder. The forward and backward motion vectors for the B-block is derived from the P motion vectors. A linear motion model is used and the temporal reference of the B and P frame is used to scale the motion vector appropriately. FIG. 3a depicts the motion vector scaling and the formula is shown below.

$$MV_F = (TR_B \times MV)/TR_P \quad (1)$$

$$MV_B = ((TR_B - TR_P) \times MV)/TR_P \quad (2)$$

where

MV is the motion vector of the P-block, $MV_F$ and $MV_B$ are the forward and backward motion vectors for the B-block, $TR_B$ is the increment in the temporal reference from the last P-frame to the current B-frame, and $TR_P$ is the increment in the temporal reference from the last P-frame to the current P-frame.

Currently the method used in the prior art assumes a linear motion model. However this assumption is not valid in a normal scene where the motion is typically not linear. This is especially true when the camera shakes and when objects are not moving at constant velocities.

A second problem involves the quantization and transmission of the residual of the prediction error in the B-block Currently the coefficients from the P-block and the B-block are interleaved in some scanning order which requires the B-block efficients to be transmitted even when they are all zero. This is not very efficient as it is quite often that there are no residual coefficients to transmit (all coefficients are zero).

SUMMARY OF THE INVENTION

In order to solve the first problem, the current invention employs a delta motion vector to compensate for the non-linear motion. Thus it becomes necessary for the encoder to perform an additional motion search to obtain the optimum delta motion vector that when added to the derived motion vectors would result in the best match in the prediction This delta motion vectors are transmitted to the decoder at the block level only when necessary. A flag is used to indicate to the decoder if there are delta motion vectors present for the B-block.

For the second problem, this invention also uses a flag to indicate if there are coefficients for the B-block to be decoded.

The operation of the Invention is described as follows.

FIG. 3a shows the linear motion model used for the derivation of the forward and backward motion vectors from the P-block motion vector and the temporal reference information As illustrated in FIG. 3b, this model breaks down when the motion is not linear. The derived forward and backward motion vector is different from the actual motion vector when the motion is not linear. This is especially true when objects in the scene are moving at changing velocities.

In the current invention the problem is solved by adding a small delta motion vector to the derived motion vector to compensate for the difference between the derived and true motion vector. Therefore the equations in (1) and (2) are now replaced by equations (3) and (4), respectively.

$$MV_F' = (TR_B \times MV)/TR_P + MV_{Delta} \quad (3)$$

$$MV_B' = ((TR_B - TR_P) \times MV)/TR_P - MV_{Delta} \quad (4)$$

where

MV is the motion vector of the P-block, $MV_{Delta}$ is the delta motion vector, $MV_F'$ and $MV_B'$ are the new forward and backward motion vectors for the B-block according to the current invention, $TR_B$ is the increment in the temporal reference from the last P-frame to the current B-frame, and $TR_P$ is the increment in the temporal reference from the last P-frame to the current P-frame.

Note: Equations (3) and (4) are used for the motion vector in the horizontal as well as the vertical directions. Thus the motion vectors are in pairs and there are actually two independent delta motion vectors, one each for the horizontal and vertical directions.

BRIEF DESCRIPTION OF THE DRAWINGS

FIG. 1a is a prior art which illustrates the prediction mode used in the ITU-T Recommendation H.261 Standard.

FIG. 1b is a prior art which illustrates the prediction mode used in the ISO-IEC/JTC MPEG Standard.

PREFERRED EMBODIMENTS

Figure 4:
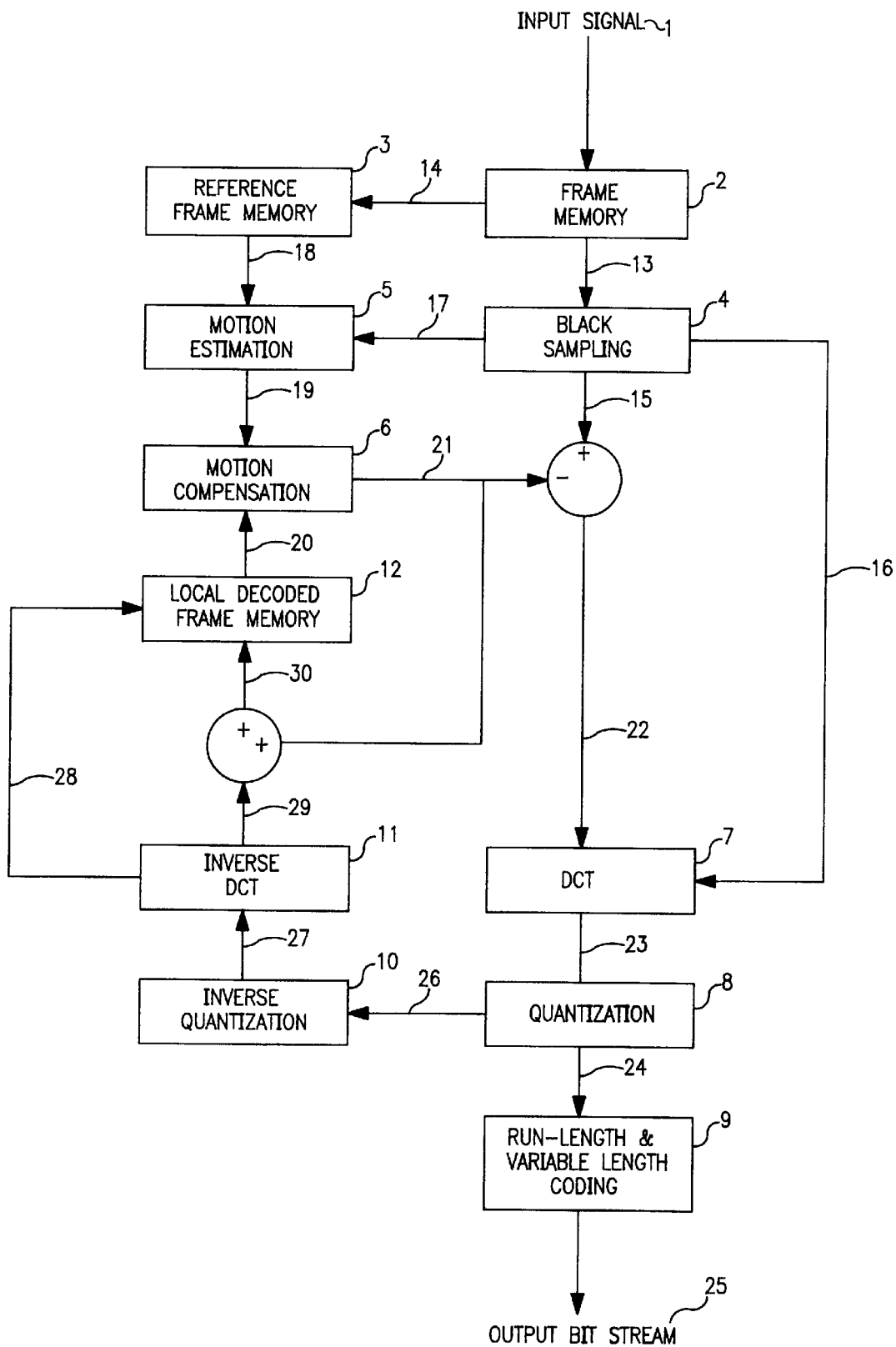
FIG. 4 illustrates the encoder functionality block diagram.

The preferred embodiment of the current invention is described here. FIG. 4 illustrates the encoding functionality diagram. The present invention deals with the method for deriving the motion vectors for the B-block. The encoding functionality is presented here for completeness of the embodiment.

The encoding functionality block diagram depicts an encoder using a motion estimation and compensation for reducing the temporal redundancy in the sequence to be coded. The input sequences is organized into a first frame and pairs of subsequent frames. The first frame, hereafter referred to as the I-frame, is coded independent of all other frames. The pairs of subsequent frames, hereafter referred to as PB-frame, consist of a B-frame followed by a P-frame. The P-frame is forward predicted based on the previously reconstructed I-frame or P-frame and the B-frame is bi-directionally predicted based on the previously reconstructed I-frame or P-frame and the information in the current P-frame.

The input frame image sequence, 1, is placed in the Frame Memory 2. If the frame is classified as an I-frame or a P-frame it is passed through line 14 to the Reference Memory 3, for use as the reference frame in the motion estimation of the next PB-frame to be predictively encoded. The signal is then passed through line 13 to the Block Sampling module 4, where it is partitioned into spatially non-overlapping blocks of pixel data for further processing.

If the frame is classified as an I-frame, the sampled blocks are passed through line 16 to the DCT module 7. If the frame is classified as a PB-frame, the sampled blocks are passed through line 17 to the Motion Estimation module 5. The Motion Estimation module 5 uses information from the Reference Frame Memory 3 and the current block 17 to obtain the motion vector for that provides the best match for the P-block The motion vector and the local reconstructed frame, 12, are passed through line 19 and 20, respectively, to the Motion Compensation module 6. The difference image is formed by subtracting the motion compensated decoded frame, 21, from the current P-block, 15. This signal is then passed through line 22 to the DCT module 7.

In the DCT module 7, each block is transformed into the DCT domain coefficients. The transform coefficients are passed through line 23 to Quantization module 8, where they are quantized. The quantized coeffcents are then passed through line 24 to the Run-length & Variable Length Coding module 9. Here the coefficients are entropy coded to form the Output Bit Stream, 25.

If the current block is an I-block or a P-block, the quantized coefficients are also passed through line 26 to the Inverse Quantization module 10. The output of the Inverse Quantization 10, is then passed through line 27 to the Inverse DCT module 11. If the current block is an I-block then the reconstructed block is placed, via line 28, in the Local Decoded Frame Memory 12. If the current block is a P-block then the output of the Inverse DCT 29 is added to the motion compensated output 21, to from the reconstructed block 30. The reconstructed block 30, is then placed in the Local Decoded Frame Memory 12, for the motion compensation of the subsequent frames.

Figure 2A:
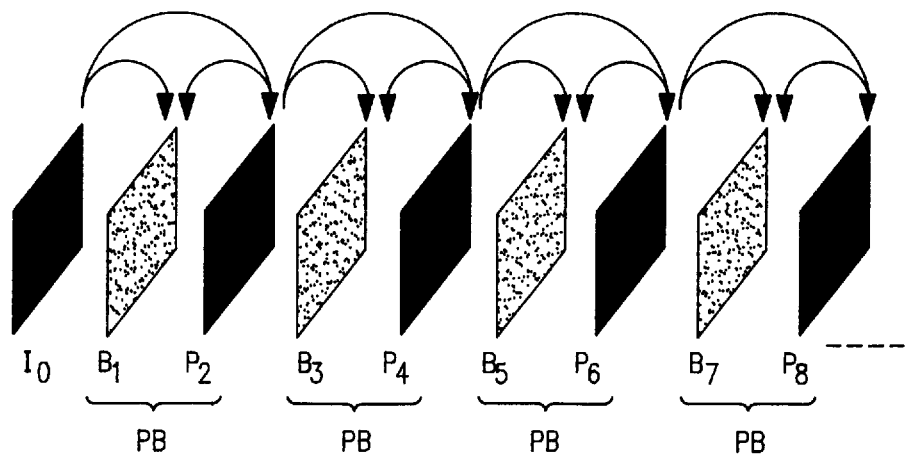
FIG. 2a illustrates the PB-frame prediction mode.
Figure 2B:
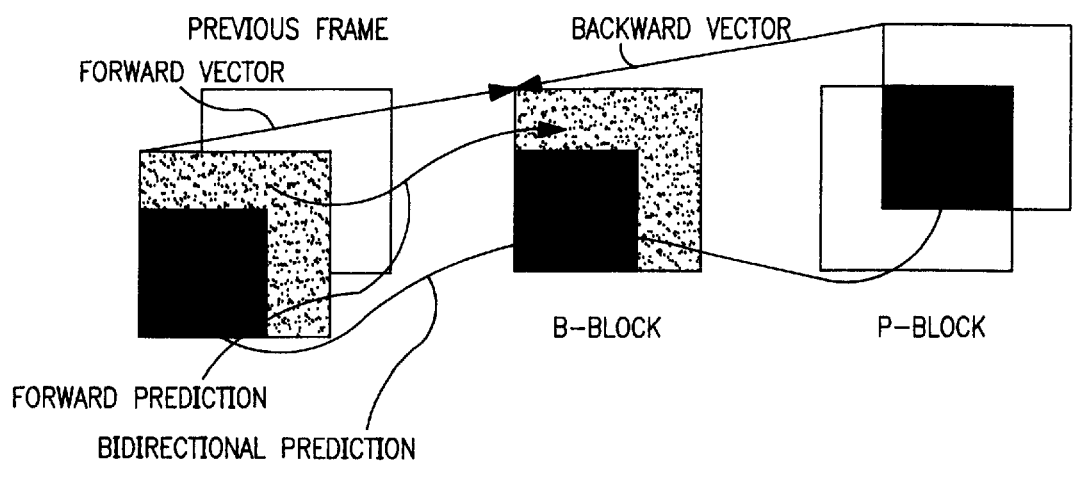
FIG. 2b illustrates the B-block bi-directional prediction mode.
Figure 3A:
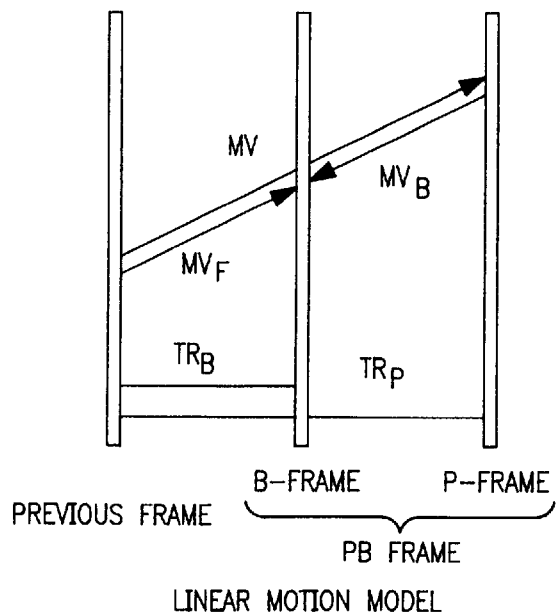
FIG. 3a illustrates the linear motion model.
Figure 3B:
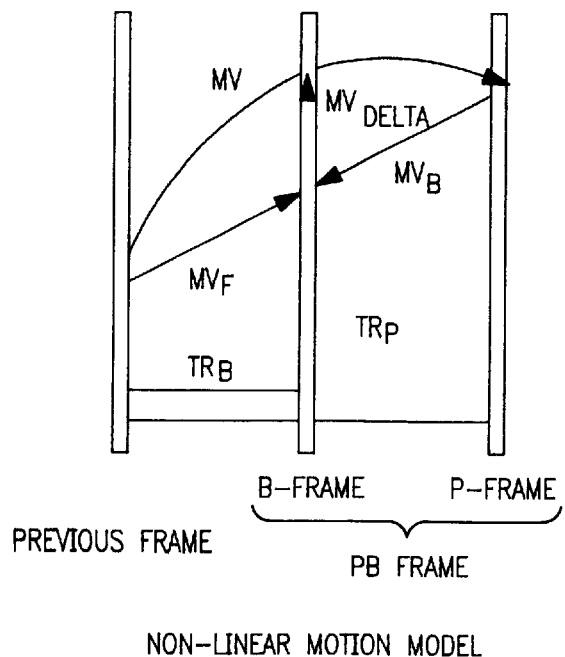
FIG. 3b illustrates the non-linear motion model of the current invention
Figure 5:
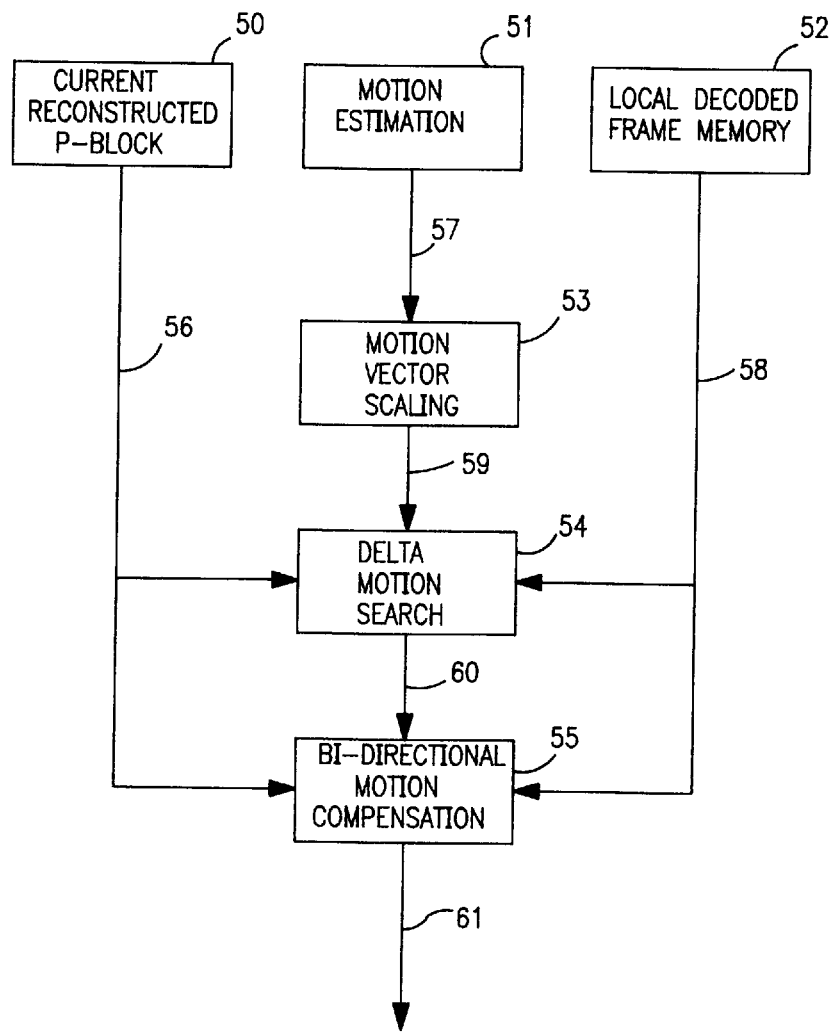
FIG. 5 illustrates the B-block bi-directional prediction functionality block diagram.

After the P-block have been locally reconstructed, the information is passed again to the Motion Compensation Module 6, where the prediction of the B-block is formed. FIG. 5 shows a more detailed functional diagram for the B-block prediction process. The P-motion vector derived in the Motion Estimation module 51, is passed through line 57 to the Motion Vector Scaling Module 53. Here the forward and backward motion vectors of the B-block is derived using the formula (1) and (2), respectively. In the present embodiment, an additional motion search around these vectors is performed in the Delta Motion Search module 54, to obtain the delta motion vector. In this embodiment the motion vector is obtained by performing the search for all delta motion vector values between −3 and 3. The delta motion vector value that gives the best prediction in terms of the smallest mean absolute difference in the pixel values of the B-block and the prediction block is chosen. The prediction is formed in the Bi-directional Motion Compensation module 55, according to FIG. 2b using the information from the Local Decoded Frame Memory 52, and the Current Reconstructed P-block 50. In the bi-directional prediction, only information available in the corresponding P-block is used to predict the B-block. The average of the P-block information and the information from the Local Decoded Frame is used to predict the B-block. The rest of the B-block is predicted using information from the Local Decoded Frame only.

The prediction difference block is then passed through line 22 to the DCT module 7. The DCT coefficients are then passed through line 23 to the Quantization module 8. The result of the Quantization module 8, is passed through line 24 to the Run-length & Variable Length Coding 9. In this module the presence of the delta motion vector and the quantized residual error in the Output Bitstream 25, is indicated a variable length code, NOB which is the acronym for No B-block This flag is generated in Run-length & Variable Length Coding module 9 based on whether there are residual error in the Quantization module 8 and delta motion vectors found in the Delta Motion Search module 54 is not zero. Table 1 provides the preferred embodiment of the variable length code for the NOB flag. The variable length code of the NOB flag is inserted in the Output Bitstream, 25, prior to the delta motion vector and quantized residual error codes.

TABLE 1

(Variable length code for the NOB flag)

| NOB | Quantized Residual Error Coded | Delta Motion Vectors Coded |
|---|---|---|
| 0 | No | No |
| 10 | No | Yes |
| 110 | Yes | No |
| 111 | Yes | Yes |

Figure 6:
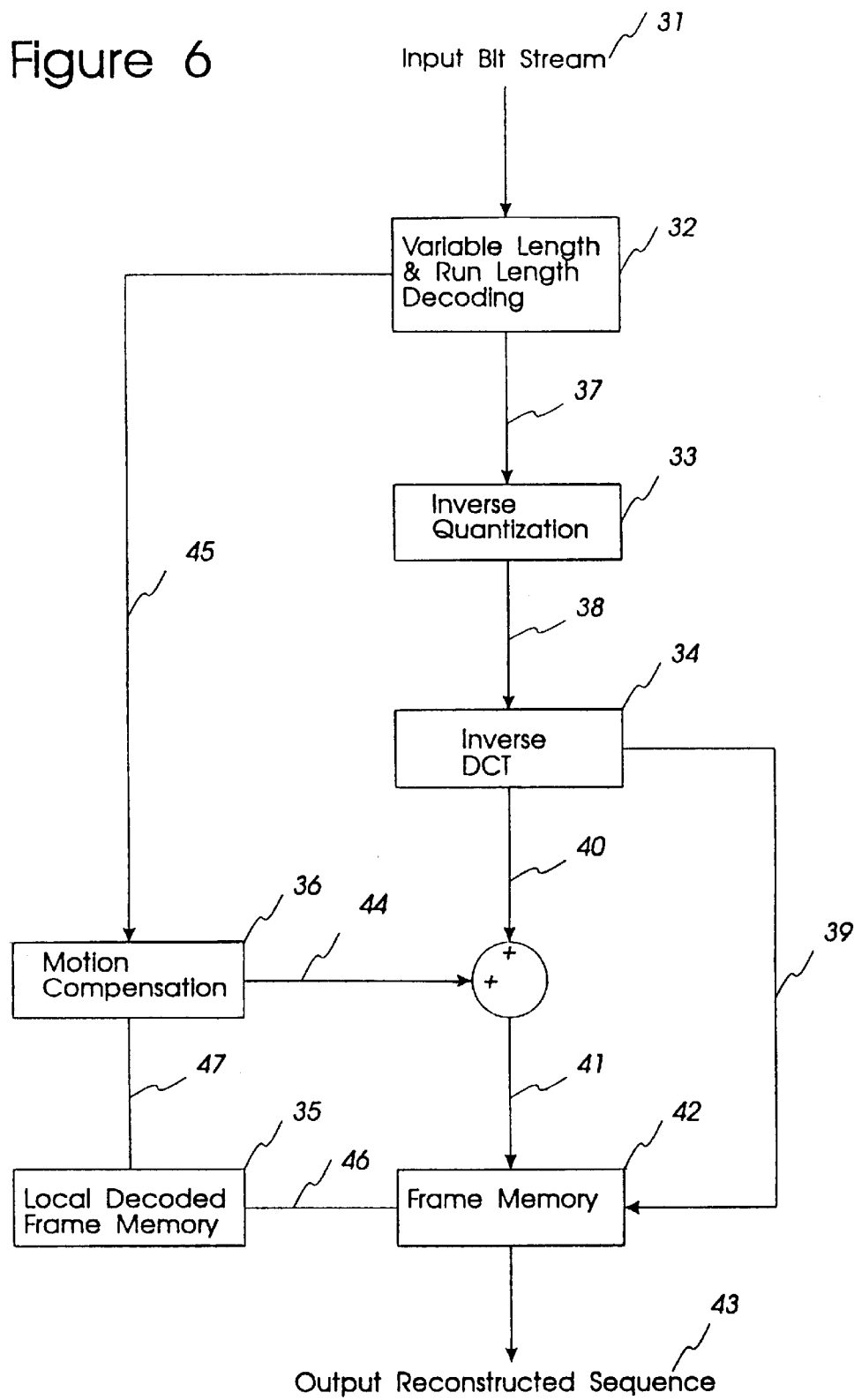
FIG. 6 illustrates the decoder functionaltity block diagram.

FIG. 6 shows the functional block diagram for the decoder. The Input Bit Stream 31, is passed to the Variable Length & Run Length Decoding module 32. The block and side information are extracted in this module. If the frame is a PB-frame then the bitstream is checked if any delta motion vector and/or quantized residual error coefficients present. The output of the module 32, is passed through line 37 to the Inverse Quantisation module 33. The output of the Inverse Quantization 33, is then passed through line 38 to the Inverse DCT module 34. Here the coefficients are transformed back into the pixel values.

If the current frame is an I-frame then the output of Inverse DCT 34, is passed through line 39 and stored in the Frame Memory 42.

If the current frame is a PB-frame, the side information containing the motion vectors are passed through line 45 to the Motion compensation module 36. The motion Compensation module 36, uses this information and the information in the Local Decoded Memory, 35, to from the motion compensated signal, 44. This signal is then added to the output of the Inverse DCT module 34, to form the reconstruction of the P-block.

The Motion Compensation module 36, then uses the additional information obtained in the reconstructed P-block to obtain the bi-directional prediction for the B-block. The B-block is then reconstructed and placed in the Frame Memory, 42, together with the P-block.

By implementing this invention, the temporal frame rate of the decoded sequences can be effectively doubled at a fraction of the expected cost in bit rate. The delay is similar to that of the same sequence decoded at half the frame rate.

As described above in the present invention a new predictive coding is used to increase the temporal frame rate and coding efficiency without introducing excessive delay. Currently the motion vector for the blocks in the bi-directionally predicted frame is derived from the motion vector of the corresponding block in the forward predicted frame using a linear motion model. This however is not effective when the motion in the image sequence is not linear. According to this invention, the efficiency of this method can be further improved if a non-linear motion model is used. In this model a delta motion vector is added to or subtracted from the derived forward and backward motion vector, respectively. The encoder performs an additional search to determine if there is a need for the delta motion vector. The presence of this delta motion vector in the transmitted bitstream is signalled to the decoder which then takes the appropriate action to make use of the delta motion vector to derive the effective forward and backward motion vectors for the bi-directionally predicted block.

What is claimed:

1. A method for encoding a sequence of video image frames comprising the steps of:

dividing a source sequence into a set of group of pictures, each group of pictures comprising a first frame (I-frame) followed by a plurality of pairs of predictively encoded frames (PB-frame pairs), each PB-frame pair having a corresponding P-block;

dividing each I-frame or PB-frame pair into a plurality of spatially non-overlapping blocks of pixel data;

encoding the blocks from the I-frame (I-blocks) independently from any other frames in the group of pictures;

predictively encoding the blocks from the second frame of the PB-frame pair (P-blocks), based on the I-blocks in the previous I-frame or the P-blocks in the previous PB-frame pair;

bi-directionally predictively encoding the blocks from the first frame of the PB-frame pair (B-blocks), based on the I-blocks in the previous I-frame or the P-blocks in the previous PB-frame pair and the corresponding P-block in the current PB-frame pair;

deriving a scaled forward motion vector and a scaled backward motion vector for the B-block by scaling the motion vector of the corresponding P-block in the current PB-frame pair;

obtaining a final forward motion vector for the B-block by adding a delta motion vector to the scaled forward motion vector; and obtaining a final backward motion vector for the B-block by subtracting the delta motion vector from the scaled backward motion vector.

2. A method for encoding a sequence of video image frames according to claim 1, wherein the scaling of the motion vector is based on a temporal reference of the first and second frames of the PB-frame pair.

3. A method for encoding a sequence of video image frames according to claim 1, further comprising the step of forming an encoded output, wherein the encoded output is a bitstream comprising:

temporal reference information for the first and second frames of the PB-frame pairs;

motion vector information for the P-blocks;

quantized residual error information for the P-blocks;

delta motion vector information for the B-blocks; and quantized residual error information for the B-blocks.

4. A method for encoding a sequence of video image frames according to claim 3, wherein the output bitstream contains additional information to indicate the presence of at least one of:

the delta motion vector information for the B-blocks; and the quantized residual error information for the B-blocks.

5. A method for decoding a sequence of video image frames comprising the steps of:

decoding the compressed video image sequence as a set of group of pictures, each group of pictures comprising an I-frame followed by a plurality of PB-frame pairs, each PB-frame pair having a corresponding P-block;

decoding each I-frame or PB-frame pair into a plurality of spatially non-overlapping blocks of pixel data;

decoding the I-blocks from the I-frame independently from any other frames in the group of pictures;

predictively decoding the P-blocks from the second frame of the PB-frame pair based on the I-blocks in the previous I-frame or the P-blocks in the previous PB-frame pair;

bi-directionally predictively decoding the B-blocks from the first frame of the PB-frame pair based on the I-blocks in the previous I-frame or the P-blocks in the previous PB-frame pair and the corresponding P-block in the current PB-frame pair;

deriving a scaled forward motion vector and a scaled backward motion vector for the B-block by scaling the motion vector of the corresponding P-block in the current PB-frame pair;

obtaining a final forward motion vector for the B-block by adding a delta motion vector to the scaled forward motion vector; and obtaining a final backward motion vector for the B-block by subtracting the delta motion vector from the scaled backward motion vector.

6. A method for decoding a sequence of video image frames according to claim 5, further comprising the step of forming a decoded output, wherein the decoded output is responsive to a bitstream comprising:

temporal reference information for the first and second frames of the PB-frame pairs;

motion vector information for the P-blocks;

quantized residual error information for the P-blocks;

the delta motion vector information for the B-blocks; and quantized residual error information for the B-blocks.

7. A method for decoding a sequence of video image frames according to claim 6, wherein the bitstream contains additional information to indicate the presence of at least one of:

the delta motion vector information for the B-blocks; and the quantized residual error information for the B-blocks.

8. A method of decoding a sequence of video image frames according to claim 5, wherein the scaling is based on a temporal reference of the first and second frames of the PB-frame pair.

9. An apparatus for encoding a sequence of video image frames comprising:

means for encoding each frame in a sequence of video image frames into a set of group of pictures, each group of pictures comprising an I-frame followed by a plurality of PB-frame pairs;

means for dividing the I-frame and the PB-frame pair into a plurality of spatially non-overlapping blocks of pixel data;

means for encoding and decoding the I-blocks of the I-frame independently from any other frames in the group of pictures;

means for storing the decoded I-blocks to predictively encode subsequent frames;

means for predictively encoding and decoding the P-blocks of the second frame of the PB-frame pair based on the I-blocks in the previous I-frame or the P-blocks in the previous PB-frame pair;

means for storing the decoded P-blocks to predictively encode subsequent frames;

means for deriving a scaled forward motion vector and a scaled backward motion vector for a B-block by scaling the motion vector of the corresponding P-block in the current PB-frame pair, the B-block being the first frame of the PB-frame pair;

means for obtaining a final forward motion vector for the B-block by adding a delta motion vector to the scaled forward motion vector;

means for obtaining a final backward motion vector for the B-block by subtracting the same delta motion vector from the scaled backward motion vector; and means for encoding the B-blocks of the first frame of the PB-frame pairs based on the I-blocks in the previous I-frame or the P-blocks in the previous PB-frame pair and the corresponding P-block in the current PB-frame pair using the final forward motion vector and the final backward motion vector.

10. An apparatus for decoding a sequence of video image frames comprising:

means for decoding each frame in a sequence of video image frames into a set of group of pictures, each group of pictures comprising an I-frame followed by a plurality of PB-frame pairs;

means for decoding the I-blocks of the I-frame independently of any other frames in the group of pictures;

means for storing the decoded I-blocks to predictively decode subsequent frames;

means for decoding the P-blocks of the second frame of the PB-frame pair based on the I-blocks in the previous I-frame or the P-blocks in the previous PB-frame pair;

means for storing the decoded P-blocks to predictively decode subsequent frames;

means for deriving a scaled forward motion vector and a scaled backward motion vector for a B-block by scaling the motion vector of the corresponding P-block in the current PB-frame pair, the B-block being the first frame of the PB-frame pair;

means for obtaining a final forward motion vector for the B-block by adding a delta motion vector to the scaled forward motion vector;

means for obtaining a final backward motion vector for the B-block by subtracting the delta motion vector to the scaled backward motion vector; and means for decoding the B-blocks of the first frame of the PB-frame pairs based on the I-blocks in the previous I-frame of the P-blocks in the previous PB-frame pair and the corresponding P-block in the current PB-frame pair using the final forward motion vector and the final backward motion vector.

11. A method for encoding a sequence of video image frames comprising the steps of:

dividing a source sequence into a plurality of groups of pictures, each group of pictures comprising a first frame (I-frame) followed by a plurality of pairs of predictively encoded frames (PB-frame pairs);

dividing each I-frame or PB-frame pair into a plurality of blocks;

encoding the blocks from the I-frame;

predictively encoding the blocks from the second frame of the PB-frame pair;

bi-directionally predictively encoding the blocks from the first frame of a PB-frame pair (B-blocks);

deriving a scaled forward motion vector and a scaled backward motion vector for the B-block;

obtaining a final forward motion vector for the B-block by adding a delta motion vector to the scaled forward motion vector; and obtaining a final backward motion vector for the B-block by subtracting the delta motion vector from the scaled backward motion vector.

12. An apparatus for encoding a sequence of video image frames comprising:

means for dividing a source sequence into a plurality of groups of pictures, each group of pictures comprising a first frame (I-frame) followed by a plurality of pairs of predictively encoded frames (PB-frame pairs);

means for dividing each I-frame or PB-frame pair into a plurality of blocks;

means for encoding the blocks from the I-frame;

means for predictively encoding the blocks from the second frame of the PB-frame pair;

means for bi-directionally predictively encoding the blocks from the first frame of a PB-frame pair (B-blocks);

means for deriving a scaled forward motion vector and a scaled backward motion vector for the B-block;

means for obtaining a final forward motion vector for the B-block by adding a delta motion vector to the scaled forward motion vector; and means for obtaining a final backward motion vector for the B-block by subtracting the delta motion vector from the scaled backward motion vector.

* * * * *

UNITED STATES PATENT AND TRADEMARK OFFICE
CERTIFICATE OF CORRECTION

PATENT NO. : 5,825,421
DATED : Thiow Keng Tan
INVENTOR(S) : October 20, 1998

It is certified that error appears in the above-identified patent and that said Letters Patent is hereby corrected as shown below:

Title page, item [73] Assignee: should read – Matsushita Electric Industrial Co., Ltd.--

Signed and Sealed this

Thirteenth Day of July, 1999

Attest:

Q. TODD DICKINSON

*Attesting Officer*     *Acting Commissioner of Patents and Trademarks*